(12) United States Patent
Feldman

(10) Patent No.: US 11,719,572 B2
(45) Date of Patent: Aug. 8, 2023

(54) REAL TIME ULTRAVIOLET LIGHT REFLECTANCE IMAGING

(71) Applicant: Daniel Feldman, Brooklyn, NY (US)

(72) Inventor: Daniel Feldman, Brooklyn, NY (US)

( * ) Notice: Subject to any disclaimer, the term of this patent is extended or adjusted under 35 U.S.C. 154(b) by 0 days.

(21) Appl. No.: 16/810,396

(22) Filed: Mar. 5, 2020

(65) Prior Publication Data
US 2020/0209056 A1    Jul. 2, 2020

Related U.S. Application Data

(63) Continuation of application No. 15/572,925, filed as application No. PCT/US2016/031634 on May 10, 2016, now Pat. No. 10,620,042.

(60) Provisional application No. 62/160,361, filed on May 12, 2015.

(51) Int. Cl.
| | |
|---|---|
| H04N 5/30 | (2006.01) |
| G01J 1/42 | (2006.01) |
| G01J 1/02 | (2006.01) |
| H04N 23/55 | (2023.01) |
| H04N 23/63 | (2023.01) |

(52) U.S. Cl.
CPC ............. *G01J 1/429* (2013.01); *G01J 1/0219* (2013.01); *H04N 5/30* (2013.01); *H04N 23/55* (2023.01); *H04N 23/63* (2023.01)

(58) Field of Classification Search
CPC ...... G01J 1/429; G01J 1/0219; H04N 5/2254; H04N 5/23293; H04N 5/30
USPC ........................................................ 348/162
See application file for complete search history.

(56) References Cited

U.S. PATENT DOCUMENTS

| | | |
|---|---|---|
| RE35,076 E | 10/1995 | Nakamura |
| 8,965,460 B1 | 2/2015 | Rao et al. |
| 2006/0092315 A1 | 5/2006 | Payonk et al. |
| 2013/0225969 A1 | 8/2013 | Bao et al. |
| 2013/0300850 A1 | 11/2013 | Millikan |
| 2014/0092238 A1 | 4/2014 | Sandhu et al. |

(Continued)

FOREIGN PATENT DOCUMENTS

JP       2014071007 A       4/2014

OTHER PUBLICATIONS

International Search Report for PCT/US2016/031634 dated Aug. 18, 2016 (2 Pages).

(Continued)

*Primary Examiner* — Nguyen T Truong
(74) *Attorney, Agent, or Firm* — Fitch, Even, Tabin & Flannery, LLP

(57) ABSTRACT

A method of monitoring ultraviolet radiation reflectance is provided for activating an ultraviolet radiation reflectance digital sensor and display monitor; capturing ultraviolet radiation reflectance passing through a lens onto the digital senor; analyzing ultraviolet radiation reflectance against a preloaded and predetermined color palate; generating a video image; and outputting the video image to the display monitor. A device is also provided for an ultraviolet radiation reflectance monitoring application which receives data from an ultraviolet radiation sensitive digital imaging plate installed on the device; wherein the application processes data received from the digital imaging plate and generates an output image of ultraviolet radiation reflectance to a video monitor communicatively connected to the device.

4 Claims, 4 Drawing Sheets

(56) References Cited

U.S. PATENT DOCUMENTS

| | | | |
|---|---|---|---|
| 2014/0125809 A1* | 5/2014 | Thorsted | H04N 5/30 |
| | | | 348/162 |
| 2014/0200054 A1 | 7/2014 | Fraden | |
| 2014/0267882 A1 | 9/2014 | O'Neill et al. | |
| 2017/0138786 A1* | 5/2017 | Shimizu | G01J 1/0407 |

OTHER PUBLICATIONS

Dr. Nichols. Dr. Nichols uses The Skin Scope to show what lies beneath. [Apr. 4, 2015]. [retrieved on Jun. 13, 2016]. Retrieved from the Internet:<URL: https://www.youtube.com/watch?v=-FH0xaR77sw> Entire document.

The Skin Cancer Foundation, www.skincancer.org Entire document.

Savazzi—Filters for UV Photography, http://www.savazzi.net/photography/uvpassfilters.html Entire document.

All You Ever Wanted to Know About Digital UV and IR Photography, But Could Not Afford to Ask, by Bjørn Rørslett http://www.naturfotograf.com/UV_IR_rev00.html#top_page Entire document.

* cited by examiner

REAL TIME ULTRAVIOLET LIGHT REFLECTANCE IMAGING

CROSS-REFERENCE TO RELATED APPLICATIONS

This application is a continuation application of U.S. application Ser. No. 15/572,925, filed Nov. 9, 2017, which is a U.S. national phase application filed under 35 U.S.C. 371 of International Application No. PCT/US2016/031634, filed May 10, 2016, designating the United States, which claims priority from U.S. Provisional Patent Application No. 62/160,361, filed May 12, 2015, which are hereby incorporated herein by reference in their entirety for all purposes.

FIELD

Described herein are ultraviolet light reflectance imaging systems and methods, and in particular ultraviolet light reflectance imaging systems and methods in real time using a smartphone and the like.

BACKGROUND

Many devices in the art have combined digital photographic and video monitoring capabilities. Such devices can include a variety of digital cameras, and computing devices such as tablets, laptops, smartphones and the like. A smartphone is a mobile telephone having an integrated computer and other features not originally associated with telephones, such as an operating system, Internet browsing, the ability to download/install/run software applications, photography, sound recording and video imaging, Some smartphone applications allow a user to activate the digital camera and view live images on the devices monitoring screen.

SUMMARY

Described herein are ultraviolet light reflectance imaging systems and methods, and in particular ultraviolet light reflectance imaging systems and methods in real time using a smartphone and the like.

Figure 1:
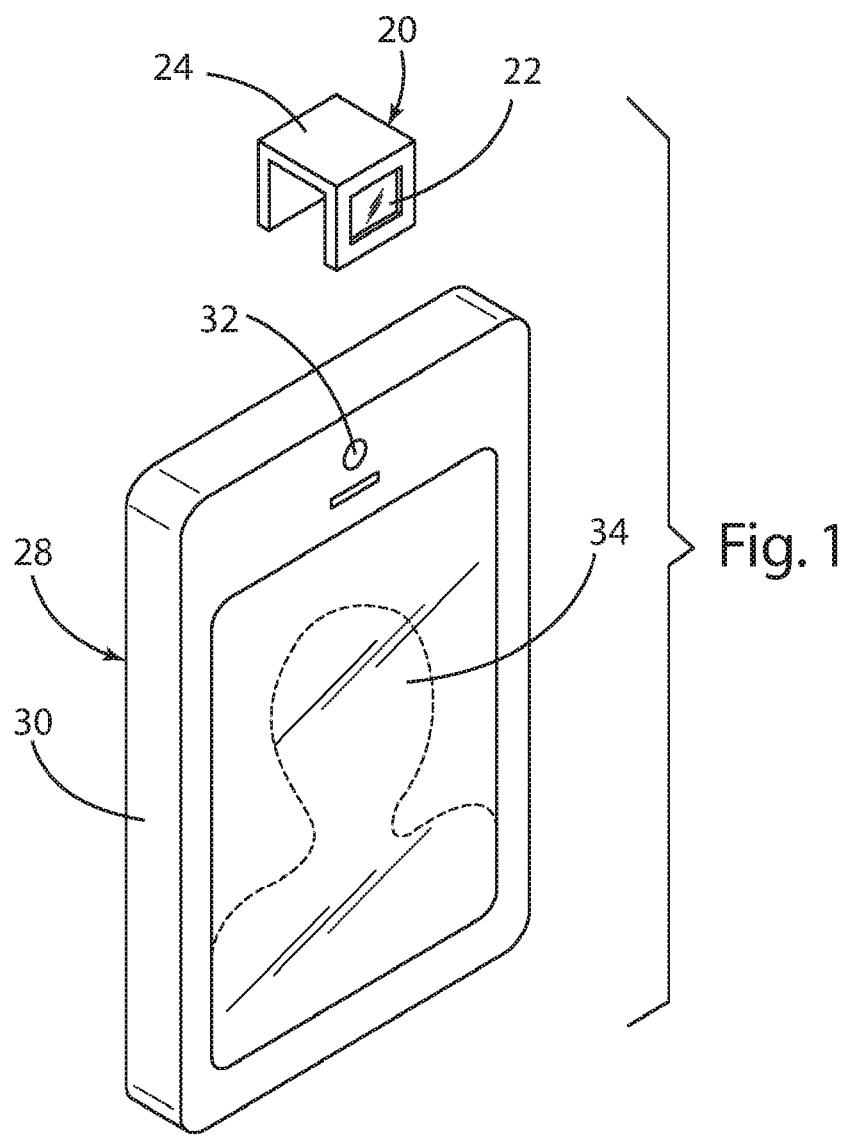
FIG. 1 illustrates a front perspective view of an exemplary application of an ultraviolet reflectance monitoring, in accordance with some embodiments.

ELEMENT LIST 20 bracket
22 UV pass filter
24 bracket frame
26 pressure sensitive adhesive
28 current system
30 smartphone
32 camera lens
34 monitor
36 UV reflected area
38 UV absorbed layer
40 monitor image
42 UV light source
500 system
510 control system
512 processor
514 memory
516 user interface
518 communication link
520 transceiver
522 display
524 user input
534 I/O port
540 power source
600 data proves flow diagram
610 start
612 launch
614 activate digital plate and monitor
616 analysis of UV reflection
618 color palette input
620 video output
622 continuous refresh to allow real time
624 program end

DESCRIPTION

Light that is visible to the human eye covers the spectral region from about 400 to 750 nanometers. The band of radiation that extends from about 1 nm to 400 nm is known as ultraviolet (UV) radiation. UV spectrographers divide UV radiation into three ranges/bands: extreme UV (1-31 nm; abbrev. EUV or XUV); far UV (or vacuum UV) (10-200 nm; abbrev. FUV or VUV); and near UV (200-380 nm wavelength; abbrev. NUV). Near UV can be further divided into three categories: Short wave UV that extends from 200 to 280 nm, also called UVC; Medium wave UV that extends from 280 to 320 nm, also called UVB; and Long wave UV that extends from 320 to 400 nm, also called UVA. Ordinary atmospheric air is opaque to wavelengths below about 200 nm. The glass in a lens is typically opaque below about 180 nm.

UVA accounts for up to 95 percent of the solar UV radiation reaching the Earth's surface. UVA can penetrate into the deeper layers of human skin and can cause skin damage, age skin prematurely, and increase a person's the risk of skin cancer. UVA radiation can penetrate glass and clouds. Thus, we are exposed to large doses of UVA throughout our lifetime. UVB can also penetrate the earth's atmosphere and is responsible for burning, tanning, acceleration of skin aging and plays a very key role in the development of skin cancer. UVB tends to cause damage in more superficial epidermal layers. UVC is filtered by the Earth's atmospheric ozone layer. These wavelengths do not reach the earth's surface and do not contribute to skin damage in humans. (See generally, the Skin Cancer Foundation, www.skincancer.org)

Thus, to prevent these deleterious effects, there is a desire and a need in society to reduce skin exposure to UVA and UVB radiation. When sun exposure is anticipated, it is a common practice to apply products called sunscreens. Sunscreens are various lotions, creams and sprays applied onto skin. Sunscreens are thus formulated to help prevent the sun's UV radiation from reaching the skin. For reasons discussed above, sunscreens should be chosen that have adequate protection against both UVA and UVB. This are commonly referred to as multi-spectrum protection, broad-spectrum protection or UVA/UVB protection. Once sunscreen is applied, UV light reaching the skin is reflected back from the skin rather than being absorbed by the skin.

One way to study UV radiation is through photography. Light that is 400 to 750 nanometers is the radiation spectrum used in normal photography. However, many cameras are also able to pick up other wavelengths of radiation. Only near UV is of interest for UV photography, because for reasons stated above ordinary air is opaque to wavelengths below about 200 nm, and lens glass (e.g. a camera lens glass) is opaque below about 180 nm. UV photography can include reflected UV radiation or UV induced fluorescence.

The present embodiments involve identifying reflected UV radiation. First there must be a UV radiation source such as the sun, a UV radiation lamp (e.g., a black light tube), or a high output flash which can release some UV radiation. There are even UV light emitting diodes (LEDs) now available. Sunlight is the most available UV radiation source for use in reflected UV photography. UV radiation varies though by atmospheric conditions, with clear sunny days providing the most UV radiation.

As mentioned above, most lens naturally block radiation about 180 nm. Further, some lenses have coatings applied to block UV light. However, a lens for use in the present embodiment must allow the transmission of at least UVA and/or UVB. Further, UV photography normally requires a filter to filter out wavelengths longer UV, so that these light wavelengths are not captured on pictures. Thus, in UV photography, the lens typically filters out all but the UV light. This is typically referred to as a UV-pass filter. Traditionally, UV-pass filters were made from different types of ionic glass. Virtually all these types of glass also transmit "near infrared" (NIR) light. For this reason, traditional types of UV-pass filters are essentially useless for digital UV photography, unless combined with a NIR-cut filter. However, multiple filters increase the risk of internal reflections and loss of contrast.

Once UV light is able to pass through a camera lens, the present embodiments also employ sensors, such as in the form of an image plate, which are sensitive to some level of UV and band radiation. It is known that typical digital camera sensors are moderately sensitive to UV-A. Typically, the sensitivity of ordinary camera sensors quickly decreases with decreasing wavelength. This can be due to a combination of factors, such as Bayer color filters and microlenses built on top of the sensor chip. Depending on its thickness and composition, the glass window covering the chip and sealing it within its ceramic package can also be an obstacle to transmission or UV-B and UV-C, but usually it is fairly well to very transparent to UV-A. (See generally, SAVAZZI—FILTERS FOR UV PHOTOGRAPHY which is incorporated herein by reference) A digital sensor may be used which is able to receive and identify a broad spectrum of wavelengths including e.g., UV, NIR, and visible light yet be able to sort all the wavelengths an output only the desired spectrum of wavelengths. In this instance, the sensor plate could have selectable ranges of output based on predetermined bandwidths. This sensor plate could then be used for digital photography by outputting only visual light. Alternatively, the sensor plate could output only UVA for use in the present embodiments.

Additionally, the present embodiment must be able output what the sensor plate is 'seeing' in some sort of fashion. In one approach, the device can take the output from the sensor plate to produce and display an image on a digital screen. A Bayer filter, which enables a charged coupling device (CCD) to read different colors at each pixel location thus providing the camera with a single-shot feasibility, is generally not able to handle non-visible spectral components and largely breaks down in identifying UV and IR irradiation. Thus, one would expect UV to register in blue hues similar to those exhibited by UV shots on film, but this is frequently not the observed situation. In fact, UV commonly triggers the red-sensitive pixels, not just the blue ones. Even green pixels may record the UV rays impinging onto the CCD surface. Software needed for decoding the CCD record into an image may react in strange ways to the non-normal data captured by the CCD, so a variety of bizarre colors may result. (See generally, All You Ever Wanted to Know About Digital UV and IR Photography, But Could Not Afford to Ask, by Bjørn Rørslett which is incorporated herein by reference). This may be fixed by preprogramming the software to assign specific color pixels to an image base on the wavelength of the UV radiation identified on the sensor plate. Alternatively, a black/white scale could be used to generally show UV reflection as black to UV absorption as white.

Accordingly, the present embodiments provide systems and methods to capture and display UV radiation reflection in real time. Such a system is exposed to a UV radiation source (such as the sun), and provides a lens to allow passage of UV radiation. Other light may be able to pass though the lens, but preferably a UV pass filter is used so that only UVA, UVB or UVA and UVB may pass. Alternately, a digital sensing plate that is able to digitally filter out visible light could also be used. The present embodiments provide for a digital sensor capable of sensing at least various predetermined UV radiation wavelengths and to produce an image in real time using a predetermined color palate or gray scale to differentiate UV reflection and/or UV wavelength. In use, the present embodiments could be used to identify skin that is adequately covered with sunscreen since it would show a high degree of reflection of UV light, while unprotected skin would show UV absorption.

Turning now to FIG. 1, a device 28 is shown according to one of the present embodiments. While device 28 is shown as a smartphone 30, it is understood that any device that can translate UV light reflectance to a user in real time can be employed. For example, any device having a lens which allows UV radiation to pass to a digital sensor which is sensitive to UV radiation and a processor to transmit a UV reflectance image to a monitor is acceptable for use. This can include smart tablets and even stand-alone devices that are designed only to display UV light reflectance in real time. Device 28, as shown has a camera lens 32 to focus and transmit UV radiation to a digital sensor disposed behind the lens (not shown), which in turn is processed to a signal to the display monitor 34.

Figure 2:
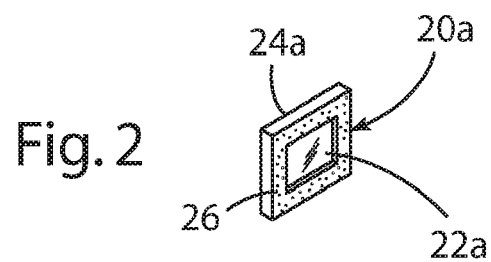
FIG. 2 illustrates a UV pass filter bracket according to another approach, in accordance with some embodiments.
Figure 3:
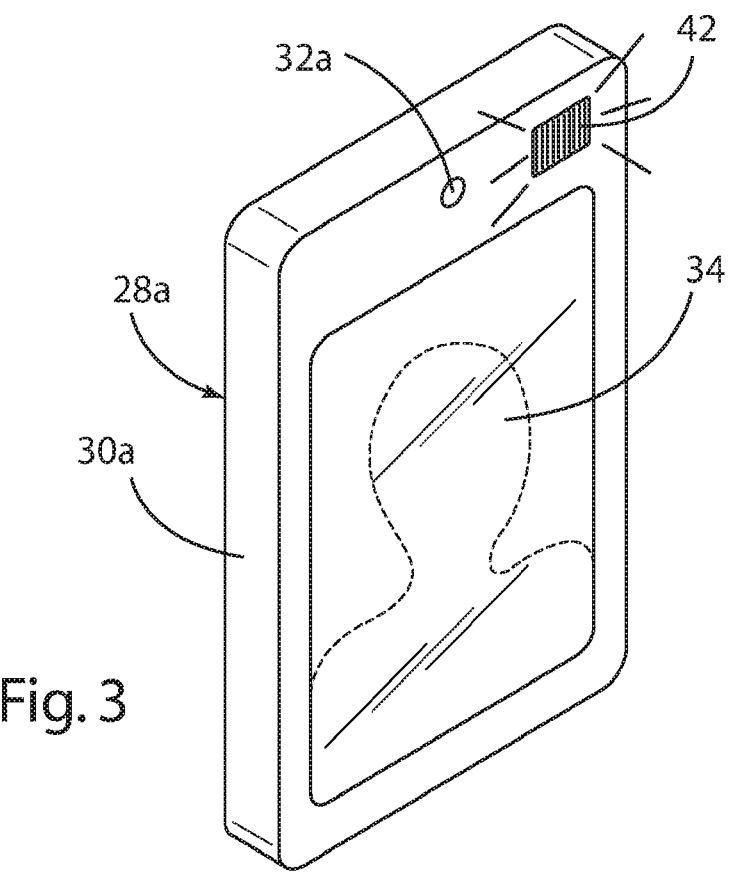
FIG. 3 illustrates a front perspective view of an exemplary application of an ultraviolet reflectance monitoring, having an option UV light in accordance with some embodiments.
Figure 4:
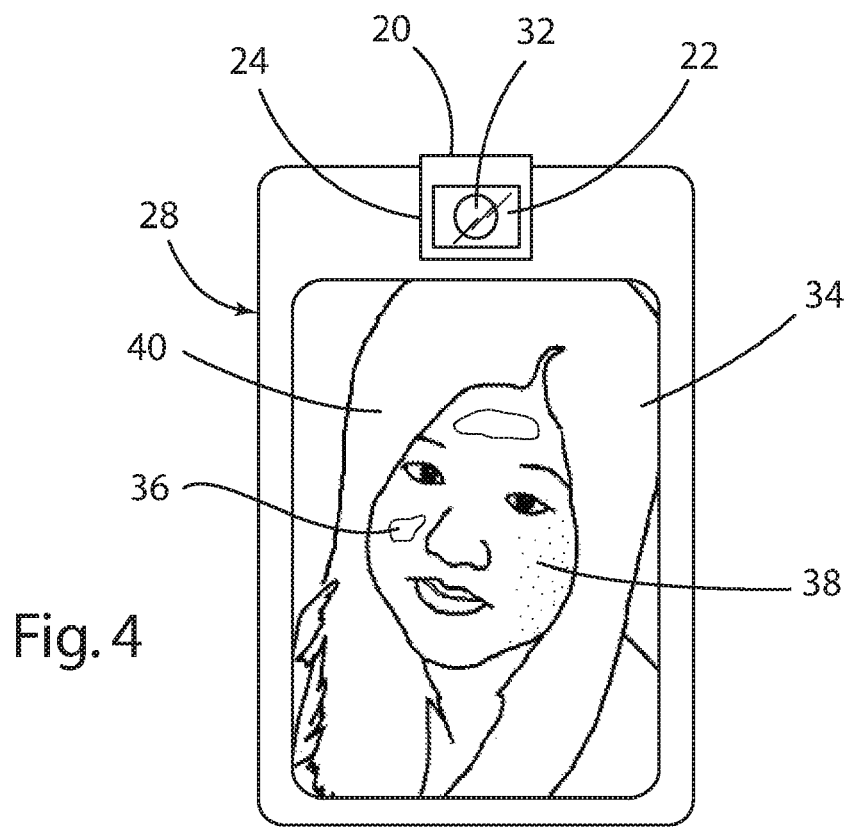
FIG. 4 illustrates a front elevational view of an exemplary application of an ultraviolet reflectance monitoring, showing an image having variable UV light reflectance, in accordance with some embodiments.

According to one approach, if desired or practical to improve transmission of the UV reflection, an optional UV pass filter 22, as described above, can be attachable to cover the camera lens 32, such as shown in FIGS. 1 and 4 with a bracket 20 having a frame 24. FIG. 2 shows an optional UV pass filter 22a attached to a frame 24a having a pressure sensitive adhesive 26 to apply to the surface of device 28 surrounding the lens 36. FIG. 3 shows a modified device 28 having an optional UV radiation source 42 for indoor use.

In use, such as shown in FIG. 4, a user 40 can launch the application housed in device 28 to activate the digital sensor, process the information, and output a real time display showing UV reflectance to the display monitor 34. For example, here user 40 has applied sunscreen to her face, then launched the application to see if she has properly applied an adequate amount of sunscreen. Shaded area 38 of the real time image could show proper UV reflection indicating a proper amount of sunscreen has been applied. However, as shown, area 36 shows little reflection and thus sunscreen has not been properly applied to that area of her skin. Since the system works in real time, the user can watch herself in the display monitor 34 applying sunscreen until there is a desired UV reflection indicating proper sunscreen coverage. For illustrative purposes, covered (i.e., reflective areas) could be displayed as green, while uncovered areas ((i.e., absorbed UV radiation) could be displayed as red. Using a gray scale of black for reflective and white for unreflected regions (or vice versa) could also be considered. Each digital sensor and processor combination commercially available may have its own pixel assignment based on how it senses different wavelengths, which could be tested for each application. Otherwise, pixel assignments could be preprogrammed into the system. It will be noted that the user should be cautioned to make sure that sunscreen is not put in contact with the lens or UV pass filter or else they risk false readings.

Figure 6:
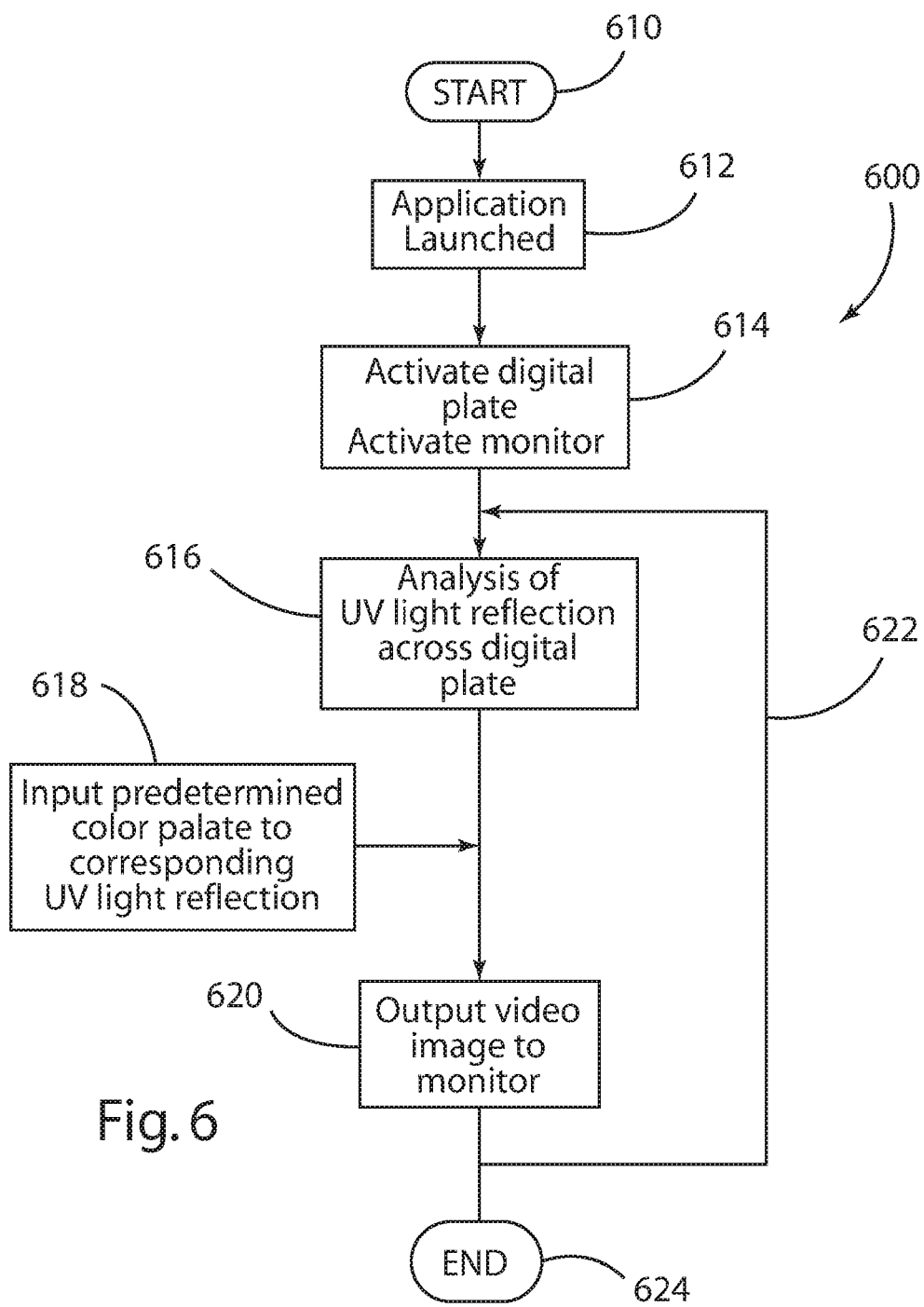
FIG. 6 is a schematic of the operation of an exemplary UV light reflectance application, in accordance with some embodiments.

FIG. 6 illustrates a schematic of a possible flow diagram 600 for the present embodiments. As shown, a user launches the application 610 for device 28 at step 612. Next the system activates the digital sensor and display monitor at step 614. As UV light enters the camera lens and is sensed on the digital sensor, the system analyzes the UV light at step 616 and applies its results to a preloaded and predetermined color palate at step 618, which is outputted to the display monitor at step 620. The system continuously refreshes the information as shown at 622 so that the results are shown to the user in real time. It is noted that in the analysis of wavelengths hitting the digital sensor, the sensor may be able to receive all wavelengths including visible wavelength of light and digitally filer to process only the UV radiation in a predetermined UV bandwidth such as found for UVA. Alternately, if a UV pass filter is applied, this step could be eliminated since only UV light would be present on the sensor. The application continues to function until the user ends the application at 624, or the system otherwise timesout or closes do to reaching any other predetermined parameters, such as a 60 second timer allows the system to operate at only one minute intervals.

Figure 5:
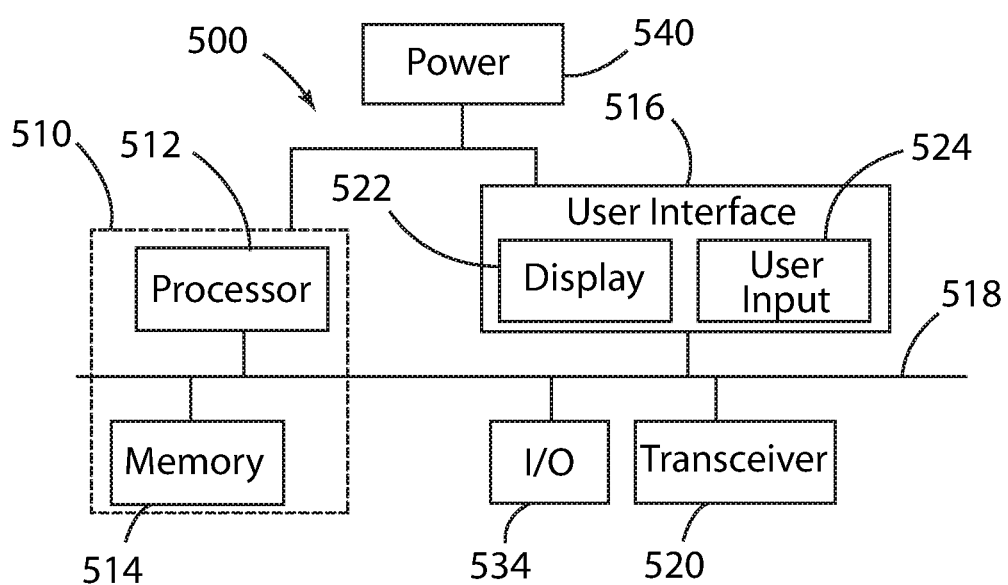
FIG. 5 illustrates an exemplary system for use in implementing methods, techniques, devices, apparatuses, systems, servers, sources and the like in monitoring UV reflectance, in accordance with some embodiments.

Further, the processes, methods, techniques, circuitry, systems, devices, functionality, services, servers, sources and the like described herein may be utilized, implemented and/or run on many different types of devices and/or systems. Referring to FIG. 5, there is illustrated an exemplary system 500 that may be used for any such implementations, in accordance with some embodiments. One or more components of the system 500 may be used for implementing any circuitry, system, functionality, apparatus or device mentioned above or below, or parts of such circuitry, functionality, systems, apparatuses or devices, such as for example any of the above or below mentioned computing device 28, processing functionality, monitoring functionality, analysis functionality, additionally evaluation functionality and/or other such circuitry, functionality and/or devices. However, the use of the system 500 or any portion thereof is certainly not required.

By way of example, the system 500 may comprise a controller or processor module, memory 514, and one or more communication links, paths, buses or the like 518. Some embodiments may include a user interface 516, and/or a power source or supply 540. The controller 512 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, programs, content, listings, services, interfaces, logging, reporting, etc. Further, in some embodiments, the controller 512 can be part of control circuitry and/or a control system 510, which may be implemented through one or more processors with access to one or more memory 514. The user interface 516 can allow a user to interact with the system 500 and receive information through the system. In some instances, the user interface 516 includes a display 522 and/or one or more user inputs 524, such as a buttons, touch screen, track ball, keyboard, mouse, etc., which can be part of or wired or wirelessly coupled with the system 500.

Typically, the system 500 further includes one or more communication interfaces, ports, transceivers 520 and the like allowing the system 500 to communicate locally, over a communication bus, a distributed network, a local network, the Internet, communication link 518, other networks or communication channels with other devices and/or other such communications or combinations thereof. Further the transceiver 520 can be configured for wired, wireless, optical, fiber optical cable or other such communication configurations or combinations of such communications. Some embodiments include one or more input/output (I/O) ports 534 that allow one or more devices to couple with the system 500. The I/O ports can be substantially any relevant port or combinations of ports, such as but not limited to USB, Ethernet, or other such ports.

The system 500 shows an example of a control and/or processor-based system with the controller 512. Again, the controller 512 can be implemented through one or more processors, controllers, central processing units, logic, software and the like. Further, in some implementations the controller 512 may provide multiprocessor functionality.

The memory 514, which can be accessed by the controller 512, typically includes one or more processor readable and/or computer readable media accessed by at least the controller 512, and can include volatile and/or nonvolatile media, such as RAM, ROM, EEPROM, flash memory and/or other memory technology. Further, the memory 514 is shown as internal to the system 510; however, the memory 514 can be internal, external or a combination of internal and external memory. Similarly, some or all of the memory 514 can be internal, external or a combination of internal and external memory of the controller 512. The external memory can be substantially any relevant memory such as, but not limited to, one or more of flash memory secure digital (SD) card, universal serial bus (USB) stick or drive, other memory cards, hard drive and other such memory or combinations of such memory. The memory 514 can store code, software, executables, scripts, data, content, lists, programming, programs, log or history data, user information and the like.

One or more of the embodiments, methods, processes, approaches, and/or techniques described above or below may be implemented in one or more computer programs executable by a processor-based system. By way of example, such a processor based system may comprise the processor based system 500, a computer, a server, a smart phone, a tablet, a laptop, a stand-alone device, etc. Such a computer program may be used for executing various steps and/or features of the above or below described methods, processes and/or techniques. That is, the computer program may be adapted to cause or configure a processor-based system to execute and achieve the functions and/or functionality described above or below. For example, such computer programs may be used to monitor a local computing device and, in particular, monitor a local computing device by capturing all packets of data requests intended to be communicated from and/or to the local computing device, analyzing the packets of the local computing device, and completing a predetermined requested data transaction. As another example, such computer programs may be used to monitor a local computing device and, in particular, monitor a local computing device by capturing all packets on a local computing device, analyzing the packets from the local computing device, and completing a predetermined requested data transaction. As yet another example, such computer programs may be used for implementing any type of tool or similar utility that uses any one or more of the above or below described embodiments, methods, processes, functionality, approaches, and/or techniques. In some embodiments, program code modules, loops, subroutines, etc., within the computer program may be used for executing various steps and/or features of the above or below described methods, processes and/or techniques. In some embodiments, the computer program may be stored or embodied on a computer readable storage or recording medium or media, such as any of the computer readable storage or recording medium or media described herein.

Accordingly, some embodiments provide a processor or computer program product comprising a medium configured to embody a computer program for input to a processor or computer and a computer program embodied in the medium configured to cause the processor or computer to perform or execute steps comprising any one or more of the steps involved in any one or more of the embodiments, methods, processes, functionality, approaches, and/or techniques described herein. For example, some embodiments provide one or more computer-readable storage mediums storing one or more computer programs for use with a computer simulation, the one or more computer programs configured to cause a computer and/or processor based system to execute steps comprising In some embodiments, one or more of the circuitry and/or functionality may be implemented external to the device or may be implemented through distinct circuitry, processors and/or functionality. For example, in some implementations, the UV reflection monitoring may reside on the local computing device independent from the device 28, and be configured to send and receive data to the device 28. Accordingly, the spirit and scope of the present embodiments is not to be limited to the specific embodiments described.

While the present embodiments have been disclosed in connection with the preferred embodiments shown and described in detail, various modifications and improvements thereon will become readily apparent to those skilled in the art.

The invention claimed is:

1. A device for real time monitoring of ultraviolet radiation reflectance, comprising:
   the device having installed thereon an ultraviolet radiation reflectance monitoring application which receives real time data from an ultraviolet radiation sensitive digital imaging plate installed on the device;
   wherein the device comprises
   a UV light emitting diode as a UV radiation source
   a lens assembly which allows transmissivity of light energy from the UV light emitting diode in a wavelength range of 1 to 400 nm UV radiation to pass to the digital imaging plate;
   wherein the application processes data received from the digital imaging plate and generates an output image of ultraviolet radiation reflectance to a video monitor communicatively connected to the device;
   wherein the device assigns a black/white scale or color scale to the output image based on the wavelength of the UV radiation identified on the digital imaging plate,
   wherein UV reflection and UV absorption shown as black to UV absorption shown as white;
   wherein one component of the device is one of a smart phone and smart tablet;
   wherein one or more of the circuitry and/or functionality is implemented external to the smart phone or smart tablet;
   wherein the device further comprises a UV pass filter attachable to the device by a pressure sensitive adhesive, and
   wherein the UV pass filter only allows UV radiation to pass through to the lens and the digital imaging plate.

2. The device of claim 1, wherein digital imaging plate digitally filters out visible light.

3. A method of monitoring ultraviolet radiation reflectance, comprising:
   providing a UV light emitting diode as a UV radiation source;
   launching a monitoring application installed on a smart tablet or smart phone having an ultraviolet radiation sensitive digital imaging plate communicatively connected to a video monitor in real time;
   capturing ultraviolet radiation reflectance from the UV light emitting diode by the imaging plate;
   inputting ultraviolet radiation reluctance to an application processor; and
   outputting ultraviolet radiation reflectance to a video monitor;
   wherein the smart tablet or smart phone comprises a lens assembly which allows transmissivity to light energy in a wavelength range of 1 to 400 nm UV radiation to pass to the digital imaging plate;
   wherein the tablet assigns a black/white scale or color scale to the output image based on the wavelength of the UV radiation identified on the digital imaging plate,
   wherein UV reflection and UV absorption are shown as black to UV absorption shown as white;
   further comprising the step of attaching a UV pass filter to the smart tablet or smart phone using a pressure sensitive adhesive;
   filtering ultraviolet radiation reflectance through the UV pass filter through to a lens before capturing ultraviolet radiation reflectance by the imaging plate.

4. A system for real time monitoring ultraviolet radiation reflectance, comprising:
   a UV light emitting diode as a UV radiation source;
   a computing device having installed thereon an ultraviolet radiation reflectance monitoring application which receives data from an ultraviolet radiation sensitive digital imaging plate;
   a UV pass filter attachable to the computing device by a pressure sensitive adhesive;
   wherein said digital imaging plate receives radiation from the UV light emitting diode via the UV pass filter and a lens installed on the computing device;

wherein said application processes data received from the digital imaging plate;
wherein said application is communicatively connected to a video monitor installed on said computing device;
wherein the system comprises a lens assembly which allows transmissivity to light energy in a wavelength range of 1 to 400 nm UV radiation to pass to the digital imaging plate;
wherein the system assigns a black/white scale to the output image based on the wavelength of the UV radiation identified on the digital imaging plate,
wherein UV reflection as is shown based on the black/white scale;
wherein one component of the computing device is one of a smart phone and smart tablet;
wherein one or more of the circuitry and/or functionality is implemented external to the smart phone or smart tablet; and
wherein the black/white scale is configured to assess sunscreen coverage on a person.

\* \* \* \* \*